Oct. 30, 1945.   F. E. FREY   2,388,135
RECOVERY OF HYDROGEN FLUORIDE
Filed Sept. 27, 1943
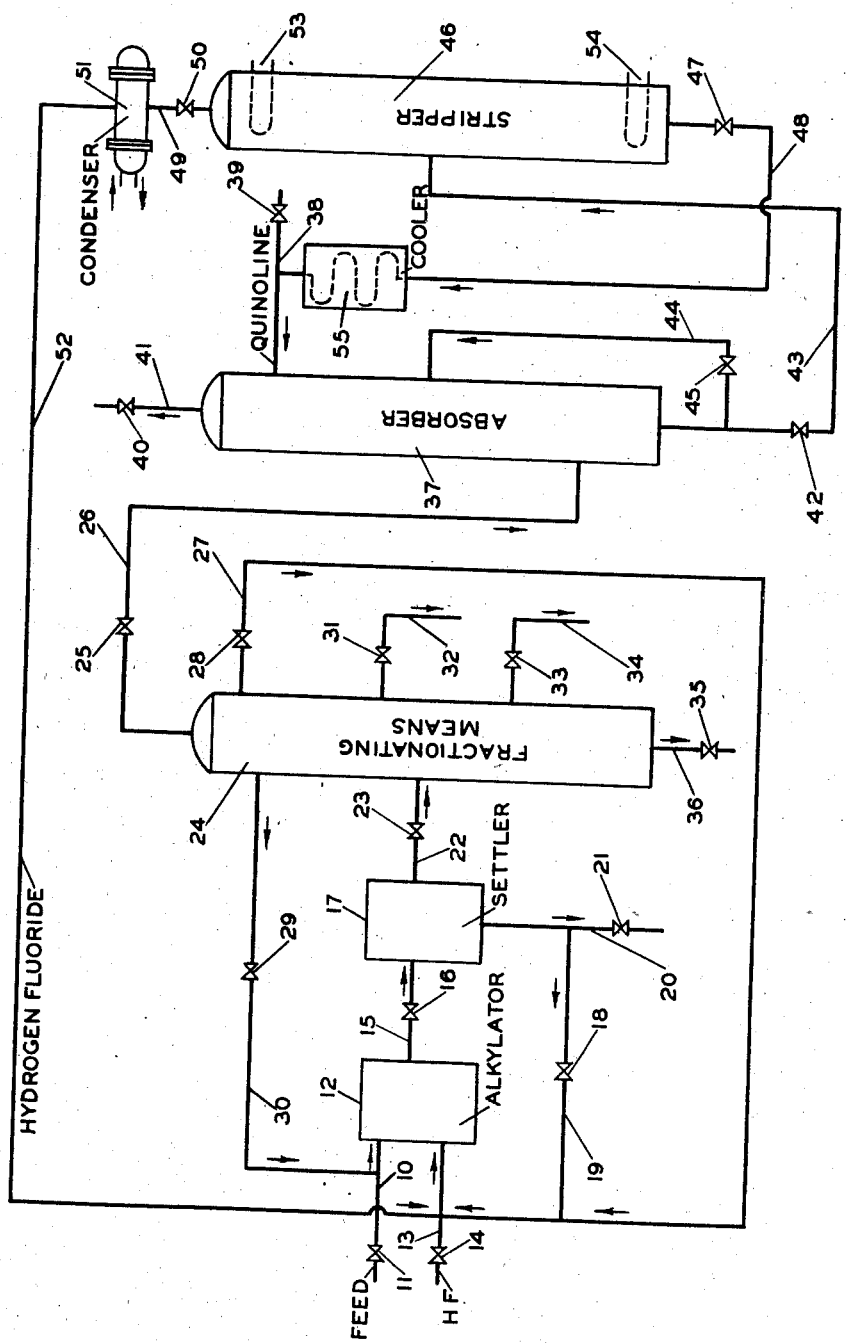
INVENTOR
F. E. FREY
BY Hudson Young + Yinger
ATTORNEYS Patented Oct. 30, 1945

2,388,135

UNITED STATES PATENT OFFICE 2,388,135

RECOVERY OF HYDROGEN FLUORIDE

Frederick E. Frey, Bartlesville, Okla., assignor to Phillips Petroleum Company, a corporation of Delaware Application September 27, 1943, Serial No. 504,071

16 Claims. (Cl. 23—153)

This invention relates to the recovery of hydrogen fluoride; in particular embodiment it relates to the recovery of hydrogen fluoride from homogeneous mixtures with substances that are substantially inert to nitrogen bases, such as hydrocarbons and water.

Concentrated or substantially anhydrous hydrofluoric acid is used in many modern processes. For example, it is used as a catalyst in the conversion of hydrocarbons by alkylation, isomerization, reconstruction, cracking, cyclization, and/or aromatization; as a reactant in the production of alkyl fluorides; and as a scrubbing agent or selective solvent in the removal of certain impurities from saturated hydrocarbons. From such processes it is often necessary or convenient to withdraw, for example, low-boiling or azeotropic mixtures of hydrogen fluoride and hydrocarbons. The corrosive nature of hydrogen fluoride makes desirable its removal from such mixtures; in the past, removal has been commonly effected by neutralization with an inorganic alkaline material, such as caustic soda or lime, but this procedure has the disadvantage that the HF becomes strongly chemically bound and is lost to the process unless reliberated by a strong acid, such as sulfuric acid. Since, in commercial processes, the loss of hydrogen fluoride in such mixtures is significant, recovery of the hydrogen fluoride as such is desirable. Similarly, when a mixture of hydrogen fluoride and water or steam is obtained, it is desirable to recover the hydrogen fluoride in substantially anhydrous form. Such a mixture is obtained, for example, when dissolved hydrogen fluoride is removed from hydrocarbon materials by means of scrubbing with water. The recovery of hydrogen fluoride from the resulting dilute aqueous solution by previously known methods is difficult, since separation from water is complicated by the fact that a maximum-boiling aqueous solution of about 40 per cent hydrogen fluoride is formed. In the present specification and claims, the term "hydrogen fluoride" will be understood to include hydrogen fluoride in either gaseous or liquid state, either alone or when mixed with water, hydrocarbons, or other materials.

An object of this invention is to recover hydrogen fluoride from admixture with other materials.

Among the objects of this invention is to recover hydrogen fluoride from homogeneous mixtures of hydrogen fluoride and hydrocarbons.

Another object is to obtain substantially anhydrous hydrogen fluoride from admixture with steam or liquid water.

Another object is to provide a process for recovering hydrogen fluoride comprising binding the hydrogen fluoride with a liquid nitrogen base and subsequently reliberating hydrogen fluoride by heat.

Other objects and advantages will be apparent to one skilled in the art from the accompanying description, drawing, and claims.

According to one specific and preferred embodiment of this invention, hydrogen fluoride is recovered from a homogeneous mixture of hydrogen fluoride and hydrocarbons by extracting, batchwise or countercurrently, the mixture in the gas phase with a liquid organic nitrogen base, preferably quinoline, at atmospheric or slightly higher temperatures, removing the substantially acid-free hydrocarbons, and heating the resulting residue at an elevated temperature to reliberate substantially pure hydrogen fluoride from the quinoline or other nitrogen base.

Understanding of this invention may be facilitated by reference to the accompanying drawing, which is a schematic flow-diagram showing an arrangement of equipment for one of many possible modes of practicing the invention. For the sake of concreteness, the arrangement shown is for the recovery of hydrogen fluoride in connection with hydrofluoric acid alkylation of an alkylatable hydrocarbon. It will be appreciated that various items of auxiliary equipment, such as pumps, heat exchangers, etc., are not shown for the sake of simplicity in the drawing, since they will be readily supplied by one skilled in the art in view of the instant disclosure.

A hydrocarbon feed enters the system through inlet 10 controlled by valve 11 and is passed to alkylator 12. This feed comprises an alkylatable hydrocarbon, which is usually an isoparaffin such as isobutane, and an alkylating agent, which is usually one or more olefins of three to five carbon atoms per molecule, such as butenes; it also usually comprises some normal butane and propane. Concentrated or substantially anhydrous hydrofluoric acid enters through inlet 13 controlled by valve 14 and is intimately mixed with the hydrocarbon feed by any convenient means in alkylator 12. A commercially satisfactory alkylation temperature is from about 75 to about 125° F., although the process may be conducted at lower or higher temperatures if desired. The pressure should be sufficient to maintain liquid-phase conditions in the alkylator; exceedingly high pressure is unnecessary. The over-all mol ratio of isoparaffin to olefin is usually from 4:1 to 20:1 in the combined feed and recycle, and much higher in the reaction zone. The time of residence of the reaction mixture in the alkylator is usually from 5 to 15 minutes, but it may be shorter or longer if desired. The volume ratio of acid to hydrocarbon is approximately 1:1, although other ratios may be maintained.

After a suitable reaction period, the reaction mixture is passed from alkylator 12 through conduit 15 and valve 16 to settler 17, in which it is separated into two phases by settling and/or centrifugation, aided, if desired, by cooling. The heavier or hydrofluoric acid phase is recycled through valve 18 and conduit 19 to alkylator 12; if desired, part of the acid may be withdrawn, as through outlet 20 and valve 21, to purification means, not shown, for purification before being returned to alkylator 12. The lighter or hydrocarbon phase is passed through conduit 22 and valve 23 to fractionating means 24, which usually comprises a system of two or more fractionating columns. From fractionating means 24 the following fractions are obtained: (1) a relatively low-boiling or azeotropic mixture of hydrogen fluoride and propane, which is passed through valve 25 and conduit 26 to absorber 37; (2) a low-boiling or azeotropic mixture of hydrogen fluoride and isobutane, which is recycled through conduit 27 and valve 28 to alkylator 12; (3) substantially HF-free isobutane, which is recycled through valve 29 and conduit 30 to alkylator 12; (4) normal butane, which is withdrawn through valve 31 and outlet 32; (5) an alkylate comprising hydrocarbons boiling in the motor-fuel range, which is withdrawn through valve 33 and outlet 34; and (6) a kettle product boiling above the motor-fuel range, which is withdrawn through valve 35 and outlet 36.

One aspect of the present invention is concerned primarily with the first of these fractions; this fraction is countercurrently contacted in absorber 37 with a liquid nitrogen base, preferably heterocyclic, for example quinoline, which is admitted through inlet 38 controlled by valve 39. Conditions of temperature and pressure in absorber 37 preferably are such that the hydrocarbon is maintained in the gaseous phase and is substantially unabsorbed by the quinoline whereas substantially complete absorption of hydrogen fluoride by the quinoline takes place. A generally satisfactory temperature range is 70 to 150° F., which is high enough to maintain the absorbent in liquid form even when the concentration of hydrogen fluoride in the quinoline far exceeds that corresponding to quinoline monohydrofluoride or quinolinium fluoride. The optimal combination of operating conditions for any specific application of the invention may be determined by trial by anyone skilled in the art in view of the instant disclosures. Substantially HF-free hydrocarbon leaves absorber 37 through valve 40 and outlet 41. The mixture of quinoline and absorbed hydrogen fluoride is passed from absorber 37 through valve 42 and conduit 43 to stripper 46. If desired, part of this mixture may be recycled by a pump, not shown, through conduit 44 and valve 45 to absorber 37 to increase the hydrogen fluoride content of stream 43.

In stripper 46 the mixture of quinoline and hydrogen fluoride is usually lowered in pressure, and is heated by heating element 54 to an elevated temperature, which is usually in the neighborhood of the boiling point of quinoline, to liberate hydrogen fluoride. A temperature of approximately 400 to 500° F. is suitable at atmospheric pressures. The liberation of hydrogen fluoride need not be carried to completion, but, if desired, may be stopped at a point at which the residue has an average composition corresponding to, for example, that of quinolinium fluoride. Any vaporized quinoline or quinolinium fluoride is condensed and refluxed by cooling coil 53. The resulting HF-depleted, quinoline-rich residue or kettle product is recycled by a pump (not shown) from stripper 46 to absorber 37 through valve 47, conduit 48 and cooler 55. Substantially pure hydrogen fluoride is passed as an overhead product from stripper 46 through conduit 49 and valve 50 to condenser 51, from which the hydrogen fluoride, as a substantially anhydrous liquid, is recycled through conduit 52 to alkylator 12.

When the absorption of hydrogen fluoride in absorber 37 is effected at such temperature and pressure that considerable absorption of hydrocarbons also occurs, these absorbed hydrocarbons may be removed in a preliminary stripping column, not shown, at an intermediate temperature, before the quinoline-hydrogen fluoride mixture is passed to stripper 46.

Generally speaking, the absorption is effectively carried out at substantially atmospheric temperatures, say from about 30 to about 150° F. The desorption is accomplished at temperatures more elevated than the absorption temperatures, frequently at about the boiling point of the base, which should usually be at least about 225° F. and preferably is above about 300° F. Atmospheric, subatmospheric, or superatmospheric pressures may be utilized in the absorption and in the desorption steps, the choice being readily made by experiment for the optimum operation of each step for a given absorbent and material treated. Often the absorption pressure will exceed the desorption pressure, with low, even subatmospheric, pressures aiding the stripping of hydrogen fluoride from the base.

Some aspects of the invention are further illustrated by the following experimental observations and examples directed primarily to the use of quinoline as the preferred base for use in this invention. The examples are not to be construed as unduly limiting, inasmuch as many other modifications may be practiced within the spirit of the invention.

*Example I*

Anhydrous hydrogen fluoride was progressively added to quinoline; after each addition, the resulting mixture, which became heated from the exothermic heat of absorption and/or reaction, was cooled to determine the approximate temperature at which incipient crystallization occurred. The data obtained were as follows:

| HF in mixture, wt. percent | Approx. crystn. temp., °F. | Remarks |
| --- | --- | --- |
| 18.7 | | No crystals at 39° F. |
| 25.4 | 52 | |
| 30.9 | 100 | Thick paste at 78° F.; melted at 93°F. |
| 39.4 | 100 | |

The final mixture contained 39.4 per cent by weight of hydrogen fluoride, corresponding to approximately 4.2 mols of hydrogen fluoride (HF) per mol of quinoline; it was practically saturated, since additional hydrogen fluoride appeared to bubble through it without being absorbed.

*Example II*

Normal butane was bubbled through a mixture of 66 per cent by weight of quinoline and 34 per cent of hydrogen fluoride. At 77° F. the effluent butane contained only 0.11 per cent by weight of hydrogen fluoride; at 112° F. it contained only 0.33 per cent.

Example III

Propane containing 0.23 per cent by weight of hydrogen fluoride was bubbled through quinoline at 111° F.; the effluent contained an average of only 0.0005 per cent by weight of hydrogen fluoride.

Example IV

Normal butane was bubbled through a mixture of 80 per cent by weight of quinoline and 20 per cent hydrogen fluoride at various temperatures. The effluent was found to contain the following concentrations of hydrogen fluoride:

| Temp., ° F. | HF, wt. percent |
|---|---|
| 112 | 0.0020 |
| 212 | 0.033 |
| 280 | 0.165 |
| 352 | 1.24 |
| 380 | 2.22 |
| 415 | 4.09 |

Example V

Heating a mixture of 80 per cent by weight of quinoline and 20 per cent hydrogen fluoride from 282 to 346° F. during a period of 2 hours caused the removal of only 0.033 per cent of the hydrogen fluoride in the mixture.

Example VI

A mixture of 66.2 per cent by weight of quinoline and 33.8 per cent hydrogen fluoride was placed in an evacuated, air-free copper vessel. On being heated at 380° F. for 24 hours this mixture became slightly darker, but it contained no solid matter. Air was then added to the copper vessel; further heating at 370° F. for 20 hours produced no discernible change. On addition of some pieces of iron pipe and still further heating, at 428° F. for 5.5 hours, a little light-brown buttery solid was formed, indicating that iron catalyzed oxidation by the air to a solid material.

Example VII

A mixture of 49.6 grams of quinoline and 23.6 grams of hydrogen fluoride was distilled in a small steel column having in its head a water-cooled copper condensing coil. This column had a 1-foot section, ½ inch in diameter, that was packed with ₃⁄₃₂-inch Fenske rings. The kettle of the column was heated by an oil bath. After approximately an hour of refluxing, when the oil bath was at 383° F., a kettle sample was removed for analysis; it contained only 22.8 per cent by weight of hydrogen fluoride, indicating that considerable hydrogen fluoride had been removed from the quinoline, since the original mixture contained 32.2 per cent of hydrogen fluoride. Over half (52 per cent) of the original hydrogen fluoride was recovered as an overhead fraction at a head temperature of approximately 60° F. while the oil bath was heated from 417 to 457° F. Analysis of a sample then removed from the kettle showed a hydrogen fluoride content of only 9.4 per cent by weight, and the distillation was discontinued. On cooling to room temperature, the kettle residue was found to be an orange mobile liquid. Except for some monoclinic crystals, there was no visual evidence of metallic fluorides or of heavy tar.

Example VIII

A mixture of 109 grams of quinoline and 105 grams of hydrogen fluoride was distilled in the same column used in Example VII except that the iron kettle was replaced by one made from Monel metal. A brief summary of the data obtained follows:

| Temp., °F. | HF distilled, g. | HF in kettle, wt. percent |
|---|---|---|
| Room | | 46.7 |
| 406 | 0 | |
| 420 | 6 | 20.7 |
| 457 | 76 | 7.3 |
| | 84 | |

In this distillation, 80 per cent of the original hydrogen fluoride was recovered as substantially pure hydrogen fluoride, without allowance for the hydrogen fluoride removed in the kettle samples; the kettle residue contained only 7.3 per cent by weight of hydrogen fluoride. This kettle residue was a deep-orange mobile liquid, free from the odor of hydrogen fluoride. To it was added 60.6 grams of hydrogen fluoride; a sample of the resulting mixture was analyzed, showing 45.9 per cent by weight of hydrogen fluoride. The distillation was repeated, and 47 grams of substantially pure hydrogen fluoride was recovered as an overhead fraction while the temperature of the oil bath was changing from 325 to 440° F.; at the last temperature the distillation was discontinued. Because of the relatively low temperature at which the distillation was discontinued, the kettle residue contained, by analysis, 14.1 per cent by weight of hydrogen fluoride; it was free from solid material.

Example IX

A gaseous mixture of low-boiling hydrocarbons is extracted with liquid anhydrous hydrofluoric acid to remove organic compounds of fluorine and of sulfur. The resulting purified hydrocarbon mixture contains gaseous hydrogen fluoride, the recovery of which is desired. Such recovery is effected as follows: The gaseous effluent from the liquid hydrogen fluoride treatment is passed to an absorber wherein it is countercurrently contacted with liquid quinoline at 120° F. to extract the hydrogen fluoride. The extract so obtained is heated in a stripping column at approximately 400 to 500° F., whereby hydrogen fluoride is liberated and is removed as an overhead fraction. After condensation, the hydrogen fluoride is suitable for reuse as an extracting medium as before, as a catalyst, or otherwise in the treatment of hydrocarbons. The stripped quinoline absorbent is recycled for reuse in absorbing hydrogen fluoride.

Example X

Hydrogen fluoride is recovered from a dilute aqueous solution, such as the constant-boiling mixture, as follows: To the solution is added sufficient quinoline to absorb the hydrogen fluoride and to prevent loss thereof when water is removed from the resulting mixture by evaporation. After evaporation of the water by heating to 250° F., the residue is heated as in Example IX to liberate hydrogen fluoride in substantially anhydrous form. The stripped quinoline is suitable for reuse in recovering additional hydrogen fluoride. If desired, when the original solution has a composition other than that of the constant-boiling mixture, this procedure may be preceded by a fractional distillation to remove either water or hydrogen fluoride, whichever is in excess, as an overhead fraction.

Example XI

A gaseous mixture of isobutane and hydrogen fluoride is passed through a fritted plate and up through a body of a close-boiling fraction derived from bone oil and comprising mainly picolines. The absorbent is maintained by external cooling at a temperature below 125° F. until the effluent gas contains appreciable amounts of HF. The rich absorbent is then heated to about its normal boiling point (about 300° F.) to desorb most of the retained hydrogen fluoride. This series of steps is repeated twice more, the absorbed hydrogen fluoride being recovered substantially completely in these cycles.

Example XII

The procedure of Example XI is repeated, using the following bases: a mixture of primary, secondary, and tertiary aliphatic amines boiling at 340–365° F., toluidine, commercial pyridine, piperydine, quinaldine (α-methyl quinoline).

Example XIII

Triamylamine absorbs hydrogen fluoride readily, forming viscous liquid. This liquid is found to be quite stable on heating until temperatures above 325° F. are reached.

Example XIV

Diethanol amine was used as an absorbent for hydrogen fluoride by gradually adding hydrogen fluoride thereto at room temperature until a somewhat viscous mass formed. The resulting heavy liquid was then heated, and decomposition began at 455° F. with liberation of absorbed hydrogen fluoride.

Example XV

A sample of liquid butane was shaken with an excess of liquid hydrogen fluoride in a metal bomb at room temperature. The resulting liquid butane saturated with hydrogen fluoride, containing about 0.5 weight per cent HF, was drawn off and passed in vapor phase through a liquid containing nitrogen bases. This liquid was an extract from a California kerosene. The effluent gases contained less than 0.1 weight per cent hydrogen fluoride.

It will be understood that quinoline, while preferred, is only one specific example of many nitrogen bases that are suitable for use in this process. The requirements that such bases must meet are that they have melting points below temperatures suitable for absorbing hydrogen fluoride, which is the meaning included in the term "liquid nitrogen base," that they boil sufficiently above the boiling point of hydrogen fluoride as to allow removal of hydrogen fluoride by stripping at an elevated temperature, that their association mixtures with hydrogen fluoride liberate hydrogen fluoride at such elevated temperature, and that they themselves do not undergo decomposition or other undesirable reactions excessively at this elevated temperature. Among nitrogen bases that can be used are relatively high-boiling alkyl and aryl amines. It is usually preferable to use heterocyclic nitrogen bases, especially those containing the nitrogen in a six-membered ring, of the type exemplified by pyridine, quinoline, isoquinoline, and homologs of these, particularly those of relatively low melting points and high boiling points. The bases of this invention may be of synthetic or natural origin; suitable single bases or mixtures thereof may be readily obtained for example from such products as bone oil, and from petroleum products such as kerosene extract and transformer oil distillate. It will of course be understood that these bases are not all necessarily exact equivalents, the precise conditions and mode of use for a given base being readily determined by trial by one skilled in the art, once given the present disclosure of principles to be followed. Various non-hydrocarbon constituents or radicals, such as halogens, hydroxy groups, etc., may comprise a portion of the molecule of the base provided they are not attached to the nitrogen atom and are not detrimental to the absorption of hydrogen fluoride by the base. The base used as absorbent may be the base alone, or may be in association with any amount of hydrogen fluoride less than that required to saturate it at the absorption conditions. One or more bases may be used in admixture with other material, such as solvents.

The exact mechanism by which hydrogen fluoride is absorbed by liquid organic nitrogen bases in accordance with this invention is not completely understood. It is believed that one molecule of hydrogen fluoride usually adds to one molecule of the base forming a salt, such as quinolinium hydrofluoride. Frequently, however, the absorbent remains liquid, rather than changing to crystals of the monohydrofluoride. Further addition of hydrogen fluoride may occur up to at least three more mols per mol of the monohydrofluoride. It is postulated that these additional molecules of HF, rather than becoming directly associated with the basic portion of the molecule, instead associate more or less with the HF molecule already associated with the base. The resulting association mixture, whatever its composition or method of formation, when heated to elevated temperatures gives up hydrogen fluoride readily until a composition corresponding to the monohydrofluoride is reached. More elevated temperatures usually seem to be required to desorb the last molecule of hydrogen fluoride. Accordingly, the process of the present invention is frequently more efficiently operated by desorbing only to about the monohydrofluoride composition, and using the same as absorbent. However, the pure base or the base in any stage of association with hydrogen fluoride less than saturation may be used. Thus, while the binding of hydrogen fluoride by liquid bases in accordance with the present invention may be due to simple absorption or to reactions such as the formation of addition compounds discussed above, or both, I do not desire to be limited by any particular theory, but only to the process steps disclosed. The term "association mixture" will be understood to include simple physical solutions obtained by absorption of HF in a liquid base and/or any addition compounds or complexes formed therebetween. Because the invention may be practiced otherwise than as specifically shown and because many modifications of it will be apparent to those skilled in the art, the invention should be limited only as set forth in the appended claims.

I claim:

1. A process for the recovery of hydrogen fluoride from admixture with a material substantially chemically inert to organic nitrogen bases under the conditions used, which comprises contacting said mixture with a liquid organic nitrogen base capable of forming a decomposable association mixture with hydrogen fluoride to bind said hydrogen fluoride, removing said inert material, and thermally decomposing the resulting residue to liberate hydrogen fluoride.

2. The process of claim 1, in which said nitrogen base has a boiling point above about 300° F.

3. The process of claim 1, in which said nitrogen base contains nitrogen as part of a heterocyclic six-membered ring.

4. The process of claim 1, in which said nitrogen base is quinoline.

5. The process of claim 1, in which said nitrogen base is isoquinoline.

6. The process of claim 1, in which said nitrogen base is pyridine.

7. The process of claim 1, in which said binding of hydrogen fluoride is effected in a continuous and countercurrent contacting of said mixture in the gas phase with said nitrogen base in the liquid phase.

8. The process of claim 1, applied to a mixture of hydrogen fluoride and a hydrocarbon.

9. The process of claim 1, applied to a mixture of hydrogen fluoride and propane.

10. The process of claim 1, applied to a mixture of hydrogen fluoride and butane.

11. The process of claim 1, applied to a mixture of hydrogen fluoride and water.

12. The process of claim 1, in which said contacting is effected at substantially atmospheric temperatures, and said decomposing is effected at approximately the boiling point of said nitrogen base.

13. The process of claim 1, in which said decomposing is effected at a temperature in the range of approximately 400° F. to approximately 500° F.

14. A process for the recovery of hydrogen fluoride from admixture with a material substantially inert to organic bases under the conditions used, which comprises binding said hydrogen fluoride by contacting said mixture with an absorbent comprising the association product of at least one mol of hydrogen fluoride with one mol of a liquid organic nitrogen base, said absorbent being capable of binding additional hydrogen fluoride, removing said inert material, and heating the resulting residue to a temperature sufficiently high to liberate thus-bound hydrogen fluoride therefrom but insufficient to deplete said absorbent to a hydrogen fluoride content of substantially less than one mol of hydrogen fluoride per mol of liquid nitrogen base.

15. A continuous process for the separation of hydrogen fluoride from admixture with a low-boiling paraffinic hydrocarbon material which comprises passing a stream of such an admixture in the gaseous phase in countercurrent contact with a stream of a liquid absorbent comprising quinoline at temperatures within the range of about 70 to about 150° F., removing the resulting substantially hydrogen fluoride-free gaseous hydrocarbon material, heating the resulting stream of rich absorbent to temperatures within the range of about 400 to about 500° F. to desorb hydrogen fluoride therefrom, recovering said hydrogen fluoride, cooling the resulting stream of lean absorbent, and returning the same to said contacting step.

16. The process of claim 15, in which a portion of said stream of rich absorbent is returned to said contacting step at a point intermediate the points of introduction of said admixture and said lean absorbent thereinto, whereby the hydrogen fluoride content of said rich absorbent is increased.

FREDERICK E. FREY.